Figure 1A:
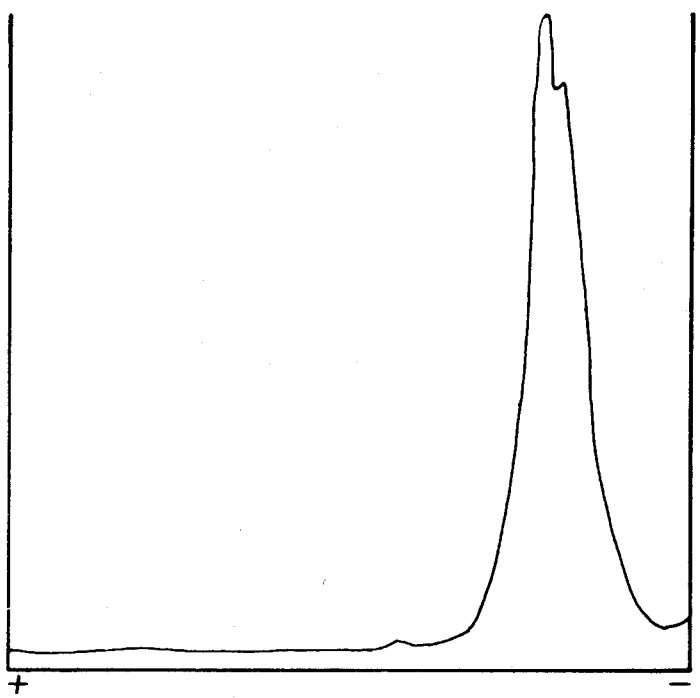

United States Patent [19]

Hüper et al.

[11] 3,926,730

[45] Dec. 16, 1975

[54] SEPARATION AND PURIFICATION OF ALPHA-AMYLASE

[75] Inventors: Fritz Hüper; Erich Rauenbusch, both of Wuppertal-Elberfeld, Germany

[73] Assignee: Bayer Aktiengesellschaft, Germany

[22] Filed: Feb. 19, 1974

[21] Appl. No.: 443,723

[30] Foreign Application Priority Data
Feb. 24, 1973 Germany............................ 2309280

[52] U.S. Cl.................................. 195/66 R; 195/68
[51] Int. Cl.² .......................................... C07G 7/02
[58] Field of Search ................................... 195/66 R

[56] References Cited
UNITED STATES PATENTS
3,834,990  9/1974  Werle et al. ........................... 195/68

OTHER PUBLICATIONS

Methods in Enzymology Vol. 22 pp. 345–378.

*Primary Examiner*—Lionel M. Shapiro

[57] ABSTRACT

α-Amylase is separated from a liquid which contains α-amylase and foreign protein impurities according to a process which comprises adsorbing the α-amylase from the liquid onto a carrier-bound α-amylase inhibitor to form an enzyme inhibitor complex and separating the complex from the liquid. Purified α-amylase substantially free from foreign protein impurities may be obtained by washing the complex and desorbing the α-amylase from the carrier-bound inhibitor.

14 Claims, 3 Drawing Figures

SEPARATION AND PURIFICATION OF ALPHA-AMYLASE

The present invention relates to the separation of α-amylase from a liquid containing foreign protein impurities. More particularly the process of the present invention relates to the use of affinity chromatography to obtain α-amylase in substantially pure form from crude biological material.

It has already been disclosed that α-amylase can be isolated from biological material, especially from pancreatic extracts. These known methods for the preparation and isolation of pure α-amylase are, however, non-specific and complicated. Thus, fractional precipitations with salts and water-soluble solvents, gel chromatography and chromatography on ion-exchangers are used for this purpose (M. L. Caldwell, M. Adams, J. T. Kung, G. C. Toralballa, J. A. Chem. Soc. 74, 4033 (1952): J. J. M. Rowe, J. Wakim, J. A. Thoma, Analytical Biochemistry 25, 206 (1968)). Affinity chromatography — also known by the name of biospecific sorption — has hitherto been used for the purification of different enzymes (see G. Feinstein, Naturwissenschaften 58, issue 8, 389 (1971)).

However, the use of affinity chromatography for the preparation of pure α-amylase with carrier-bound inhibitors has not hitherto been disclosed.

More specifically the present invention comprises a process for the separation of α-amylase from a liquid which contains α-amylase and foreign protein impurities which comprises adsorbing the α-amylase from the liquid onto a carrier-bound α-amylase inhibitor to form an enzyme-inhibitor complex, and separating the complex from the liquid.

The process of the present invention is especially useful for obtaining α-amylase in substantially pure form that is substantially free from foreign proteins. α-Amylase substantially free from foreign impurities is obtained by washing the complex obtained according to the preceding paragraph and desorbing the α-amylase from the carrier-bound inhibitor thereby obtaining α-amylase substantially free from foreign protein impurities.

It is distinctly surprising that α-amylase can be obtained in a very pure form in a one-step process from a biological crude extract, especially pancreas extract, since according to the prior art a large number of process steps was necessary for the preparation even of α-amylase of lower purity. Furthermore it is surprising that in the process according to the invention no denaturing of the pure α-amylase, which is otherwise rather unstable in aqueous solution, takes place. Surprisingly, the α-amylase can be obtained, alongside other concomitant enzymes, from the biological crude extract without modifying or inactivating the concomitant enzymes which are not bound by the α-amylase inhibitor.

The process according to the invention for the preparation of α-amylase has a series of advantages over the previously known processes for the preparation of the same enzyme.

Thus, the solutions of extracts of animal organs can be employed in a single-step process without any prior purification. By this means, an enrichment from about 50 U/mg of protein or below to 350 U/mg of protein can be achieved without difficulty. (All enzyme activities of the unit U, quoted in this application, were determined by the F.I.P. test (Fourth Report of the F. I. P Commission, J. Mond. Pharm. 1968, 3,337)).

After the extraction of the amylase, all other enzymes still present in the extract which remains can be isolated. The process according to the invention is distinguished by great simplicity even on an industrial scale. The carrier-bound inhibitor can be re-used after desorption of the α-amylase. Even after repeated use, the capacity for α-amylase remains practically completely preserved.

The process according to the present invention for the separation of α-amylase is thus an enrichment of the art.

The course of the process for the purification of α-amylase according to the present invention can be represented by the following scheme:

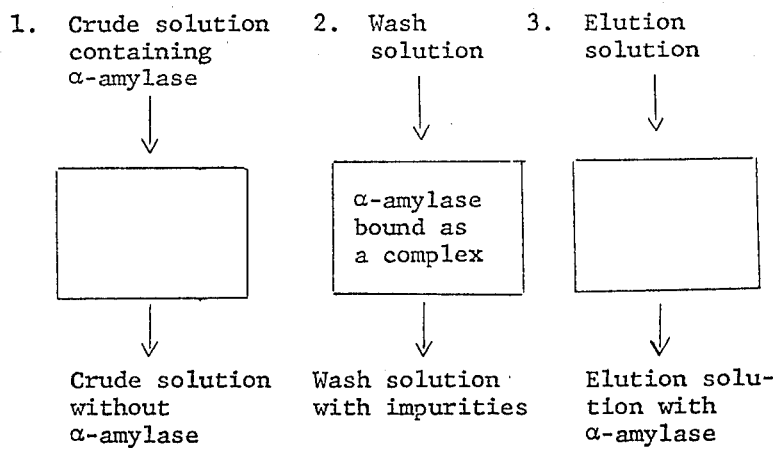

The liquid employed in the process according to the present invention generally consists of animal organ extracts, preferably pancreatic extracts, especially porcine pancreatic extract.

The carrier-bound α-amylase inhibitors employed in the process according to the invention can be prepared by methods which are in themselves known from the carrier resins and α-amylase inhibitors.

Examples of inhibitors which have proved suitable for the process according to the invention are the inhibitor from wheat, which can be obtained by the process of German Offenlegungsschrift (German Published Specification) No. 2,003,934 (British patent specification No. 1,330,230), and the α-amylase inhibitor from microbes of the order Actinomycetales according to German Offenlegungsschrift (German Published Specification) No. 2,064,092 (DBP). α-Amylase can be reversibly inhibited by the two above-mentioned α-amylase inhibitors.

The α-amylase inhibitor from wheat according to German Offenlegungsschrift (German Published Specification) No. 2,003,934 (British Patent No. 1,330,230) is a polypeptide and can be coupled to polymeric carrier resins according to the methods known from the literature for coupling of proteins and enzymes.

A very suitable carrier resin for this purpose is the copolymer, in bead form, of 70% (w/w) of tetraethylene glycol dimethacrylate, 20% (w/w) of methacrylic acid and 10% (w/w) of maleic anhydride, described in German Patent Application P 22 15 512.0 (DBP), and in German Patent Application P 22 15 687.2 (DBP) which corresponds to U.S. Ser. No. 345,452, filed Mar. 27, 1973, now U.S. Pat. No. 3,871,964.

The coupling of the α-amylase inhibitor from wheat is here carried out analogously to the processes described in U.S. Ser. No. 345,452, filed Mar. 27, 1973, at pH 6.3 in a solution of as low salt content as possible. However, carriers of other composition can also be used. Thus, for example, the α-amylase inhibitor can, according to the above process, also be coupled to carriers containing anhydride groups which have been prepared according to German Offenlegungsschrift (German Published Specification) 1,908,290. It is also possible to effect coupling to carriers with free carboxyl or primary amino groups by means of water-soluble carbodiimides (P. Cuatrecasas, J. Biol. Chemistry 245, 3059 (1970)). Other suitable carriers are swollen Agaroses (for example Sepharoses), which, when activated with cyanogen bromide according to German Offenlegungsschrift (German Published Specification) 1,768,512, bind the α-amylase inhibitor from wheat by covalent bonds.

The carrier used in the process of the present invention should preferably be of very hydrophilic character, and should have the swellability associated therewith. This is because it is highly advantageous, for the process of the invention, that not only the inhibitor but subsequently also the molecule of the α-amylase should be able to penetrate into the pores of the carrier and thereby interact with the inhibitor. The good results in enrichment of α-amylase show, surprisingly and contrary to the opinion generally taught, that carriers with anionic groups, which act as carbon exchangers, can also be used successfully for affinity chromatography, at least in this instance. As is shown later, the eluted α-amylase contains no detectable amount of foreign proteins. In a control experiment with the adsorbents used, without the coupled inhibitor, it was possible to demonstrate that no enzyme activity is bound nonspecifically to the carrier. The adsorption of the α-amylase on the carrier-bound amylase inhibitor is therefore highly specific and is not attributable to other effects such as, for example, ionic binding.

The amylase inhibitor from Actinomycetales according to German Offenlegungsschrift (German Published Specification) 2,064,092 (DBP) is a carbohydrate derivative. It can therefore not be coupled to a matrix by the above-mentioned methods, which are predominantly only suitable for proteins and polypeptides. However, a very effective adsorbent for α-amylase can be prepared from this inhibitor by introducing into the inhibitor, with the aid of cyanogen bromide, reactive groups which react with the free amino groups of the polymer and are thereby fixed to the carrier. An example of such an insoluble polymer is aminoethylcellulose. The use of polyacrylamide gels, for example Biogel P 10, into which primary amino groups have been introduced by trans-amidation with 1,2-diaminoethane, is particularly advantageous. The course of the reaction can be represented by the following equation:

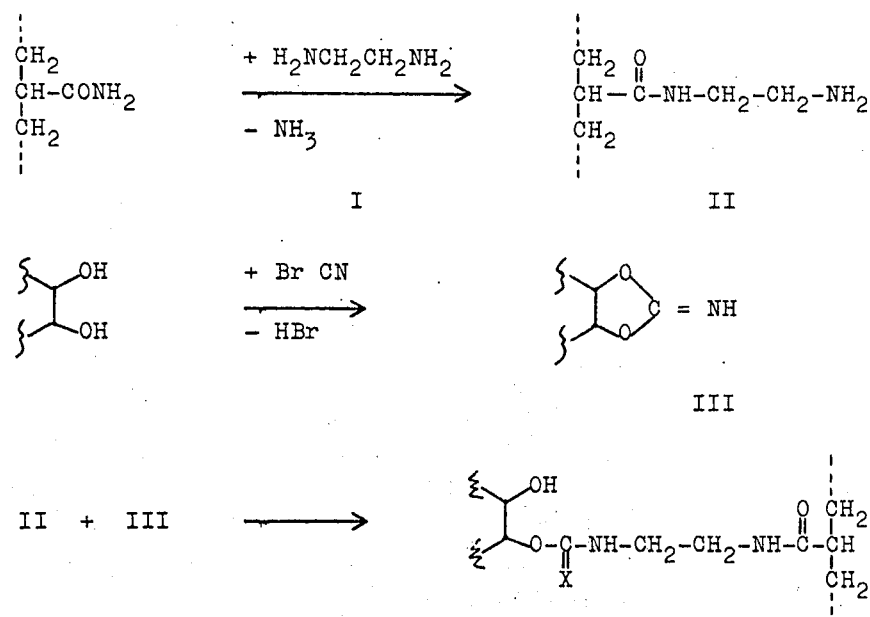

wherein X can be an imino group or oxygen (=NH or =O).

An aqueous solution of the inhibitor is allowed to react with cyanogen bromide at a temperature of 0°–50°C, preferably 20°C, in the alkaline pH range, preferably at pH 11.0. During the reaction, the pH value is kept constant by means of sodium hydroxide solution. After the uptake of alkali has ceased, the aminoethyl polymer is added and the mixture is stirred overnight. The carrier-bound inhibitor is filtered off and thoroughly washed successively with 0.2 M sodium chloride solution and with water.

In carrying out the process according to the invention, the carrier-bound α-amylase inhibitors prepared according to the present invention are brought together with extracts of biological material. In this way, the enzyme can be extracted highly specifically, by stirring, from extracts of animal organs, especially pancreas, and plants and micro-organisms.

The use of columns in the process according to the present invention is particularly advantageous.

It is advisable after the adsorption of the α-amylase on carrier-bound α-amylase inhibitor to wash the enzyme-inhibitor complex formed with sodium chloride solution, preferably 0.5 molar sodium chloride solution, and with water.

Amylases other than α-amylase are not adsorbed by the process according to the invention. Accordingly, the α-amylase prepared according to the invention contains no saccharogenic amylases.

The process of the invention may be applied to the removal of α-amylase which is itself present as an impurity in enzyme preparations. If, for example, an extract of pig pancreas prepared according to German Patent Specification No. 910,580 is filtered through a column of the adsorbent according to the invention, the eluate contains no α-amylase but contains all other proteins originally present.

The α-amylase adsorbed, according to the invention, on the carrier-bound inhibitors, can be desorbed specifically with a solution of water-soluble starch — starch made soluble by heating with glycerol according to Zulkowsky is particularly suitable for this purpose — at 0°– 50°C, preferably at 25°C. The α-amylase can be obtained from the eluates containing starch by, for example, binding to ion-exchangers and subsequent desorption. A precipitation with ammonium sulphate is advantageous.

Analogously, inhibitor solutions from Actinomycetales can be used for the desorption of the α-amylase. In this case, the eluted α-amylase inhibitor complex can be separated into its components by chromatography on a molecular sieve, for example on Biogel P 10.

As is shown by the chromatographic investigation, the α-amylase purified according to the invention shows no foreign proteins.

The drawings of the disc electrophoresis are intended to serve to illustrate the purity of the α-amylase which has been enriched according to the invention. The numerous protein bands of the starting material for the enrichment of α-amylase (see FIG. 1b) were reduced by the one-step process to two bands (see FIG. 1a) which, as is shown by FIG. 2, both display α-amylase activity. Thus one is dealing with two iso-enzymes of α-amylase.

Figure 1B:
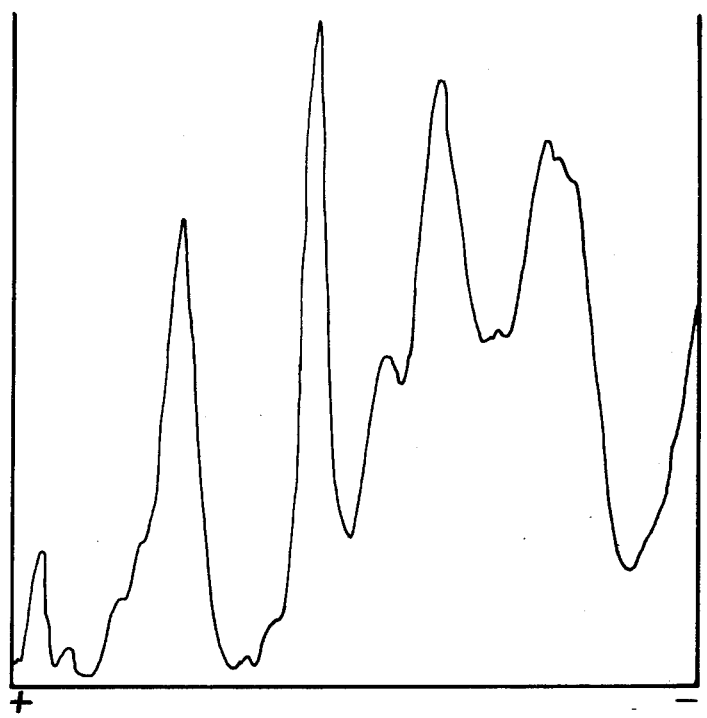
Figure 2:
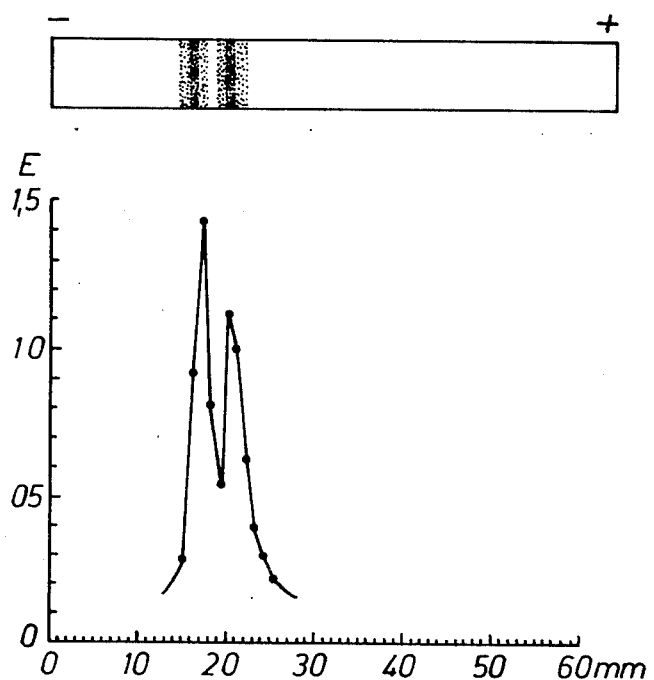

The electropherogram of the α-amylase prepared according to Example B 1 is shown in FIG. 1a. The electrophoresis was carried out in 7.5% strength polyacrylamide gel, without upper gel, in a tris-buffer system of pH 9.5. At a constant current intensity of 4 mA per tube and a potential of 150–200 volt the migration time was 60 minutes. Coomassie Brilliant Blue R250 was used for staining.

The gel was subsequently evaluated densitometrically with a Vitron extinction recorder at 620 mm.

FIG. 1a (Tube 1)

α-Amylase prepared according to Example B 1. 2 μl of eluate concentrated by ultra-filtration were applied (10 U).

FIG. 1b (Tube 2)

Pig pancreas extract. This extract was used as the starting material for enriching the α-amylase according to Example B 1. The specific activity was 97 U/mg of protein. 10 U were applied.

FIG. 2 shows the activity distribution of the fractions, obtained by disc electrophoresis, of α-amylase enriched according to the invention. The electrophoresis was carried out as indicated for the case of FIG. 1; however the migration time was extended to 100 minutes. 40 μl of the preparation prepared according to Example B 1 (19 U) were applied. One tube was stained with Coomassie Brilliant Blue R250 and a tube prepared in parallel thereto was cut into fractions which were each eluted with 10 ml of 0.02 M buffer of pH 6.9. The α-amylase activity was determined in the eluates.

The properties of α-amylase, especially the description of their biochemical action, are described in the following publication: E. H. Fischer and E. A. Stein, The Enzymes, Vol. 4, pages 313–343, Academic Press, New York, London (1960).

The α-amylase prepared according to the invention can be employed in a known manner for numerous purposes; it can, for example, be used as an important constituent of digestive enzyme preparations.

PREPARATION EXAMPLES

A. Preparation of the carrier-bound α-amylase inhibitors.

Example A 1

A copolymer, in bead form, of 70% (w/w) of tetraethylene glycol dimethacrylate, 20% (w/w) of methacrylic acid and 10% (w/w) of maleic anhydride was prepared according to the instruction of German Patent Application P 22 15 512.0 (DBP). 100 g of this anhydride resin were suspended in 3 l of water and a solution of 25 g of amylase inhibitor from wheat bran, containing 267 amylase inhibitor units per mg, prepared according to DOS (German Published Specification) 2,003,934, (British patent specification No. 1,330,230), in 1 l of water was added. The pH was kept constant at 6.3 by addition of 2 N sodium hydroxide solution, using a pH-stat. The mixture was stirred overnight at room temperature. Thereafter, the product was filtered off on a G 3 glass frit and rinsed with 2 l of 0.05 M phosphate buffer of pH 7.5 containing 1 M of sodium chloride, and subsequently with 2 l of the same buffer without sodium chloride. After suction-draining, 446 g of moist inhibitor resin were obtained.

Example A 2

200 g of Sepharose 4 B were washed on a glass frit with 10 l of water, suspended in 100 ml of water and added, at a temperature of 20°C, to a solution of 3 g of cyanogen bromide in 150 ml of water. The pH value of the suspension was kept at pH 11.5 by addition of 2 N sodium hydroxide solution, using a pH-stat. The product was then filtered off and rinsed with 1 l of water and 2 l of 0.1 M sodium bicarbonate solution. The gel was then suspended in 100 ml of water and a solution of 1.5 g of the amylase inhibitor from wheat, having an activity of 267 amylase inhibitor units per mg, in 100 ml of water containing 15 ml of 0.02 M phosphate buffer of pH 7.0, was added. The reaction mixture was stirred overnight in a cold-room. The gel was then filtered off and washed, on a column of 30 mm diameter, successively with 4 l of 0.5 M sodium chloride solution, 2 l of 0.02 M sodium glycerophosphate buffer of pH 6.9, containing 0.002 M of calcium chloride, and 2 l of water.

Example A 3

A copolymer was prepared according to the instruction of DOS (German Published Specification) 1,908,290 from 4.7% (w/w) of N,N'-methylene-bis-acrylamide, 71.5% (w/w) of acrylamide and 23.8% (w/w) of maleic acid. 50 g of this resin, in the anhydride form, were reacted with 10 g of amylase inhibitor as indicated in Example A 1. After filtration, 550 g of moist inhibitor resin were obtained.

Example A 4

10 g of Biogel P 10 were suspended in 100 ml of 1,2-diaminoethane and boiled for 3 minutes under reflux. The reaction mixture was added to 500 ml of cold water. The strongly swollen Biogel was filtered off and successively washed with 5 l of water and 5 l of 0.1 M sodium chloride solution until neutral. After filtration, 59 g of moist aminoethyl-Biogel were obtained.

4 g of amylase inhibitor from Actinomycetales, having an activity of 3,300 AIU/mg (amylase inhibitor units), prepared according to DOS (German Published Specification) 2,064,092, were dissolved in 150 ml of water and the pH was adjusted to 11.0 with 2 N sodium hydroxide solution. 400 mg of cyanogen bromide were added at 20°C, while stirring, and the solution was kept at pH 11.0 by adding 2 N sodium hydroxide solution. After completion of the alkali uptake (approx. 15 minutes) 50 g of the previously prepared amino-ethyl-Biogel were added. The mixture was stirred overnight at 4°C and the gel was filtered off. It was thoroughly washed with water and 0.2 M sodium chloride solution.

B. Isolation of the pure α-amylase

Example B 1

440 g of the moist inhibitor resin prepared according to Example A 1 were suspended in water in a column of 50 mm diameter. 1.0 l of an aqueous extract of pig pancreas prepared according to DBP 910,580 and containing 1,500 U/ml of α-amylase = 1,500,000 U, was filtered through the column. The column was rinsed with 1 l of 0.2 M sodium chloride solution and 10 l of 0.002 M calcium chloride solution. No α-amylase was present in the eluate. The enzyme was eluted with 2 l of a 5% strength starch solution (starch, soluble according to Zulkowsky purchased from Merck Darmstadt in 0.02 M sodium glycerolphosphate buffer of pH 6.9, with the addition of 0.002 M calcium chloride. The flow speed was 80 ml per hour. The eluate contained a total of 945,000 U of amylase corresponding to 63% relative to the activity of the starting material. The eluate was concentrated in vacuo to 1,000 ml and 200 g of ammonium sulphate were added at 4°C, while stirring. After standing overnight, the mixture was centrifuged and the precipitate was dissolved in 0.002 M calcium chloride solution and dialyzed against 0.002 M calcium chloride solution. After freeze-drying, α-amylase of specific activity 350 U/mg of protein was obtained.

Example B 2

200 g of the inhibitor resin prepared according to Example A 2 were suspended in a column of 30 mm diameter. A solution of 500 mg of crude α-amylase of activity 68 U/mg in 10 ml of 0.02 M buffer of pH 6.9 (a total of 34,000 U) was applied to the column. The column was rinsed with 2 l of 0.02 M buffer of pH 6.9 and was then eluted with 250 ml of 5% strength starch solution according to Zulkowsky, using a flow speed of 15 ml/hour. The eluate contained a total of 18,500 U of α-amylase, corresponding to 54% relative to the activity of the starting material. The α-amylase was isolated from the eluate according to Example B 1 by ammonium sulphate precipitation and contained 315 U/mg protein.

Example B 3

550 g of the moist inhibitor resin prepared according to Example A 3 were employed, as described in Example B 1, for the preparation of α-amylase. 900 ml of an aqueous extract of pig pancreas, containing 1,500 U/ml, prepared according to DBP 910,580 and corresponding to 1,350,000 U of α-amylase, were employed as the starting material. After elution with starch solution, 801,000 U of α-amylase (59% relative to the starting material) were obtained.

Example B 4

10 g of the moist inhibitor resin prepared according to Example A 4 were suspended in a column of 15 mm diameter. 25 ml of a solution of 25 mg of α-amylase, having an activity of 246 U/mg, corresponding to 6,150 U, were filtered through the column. The column was rinsed with 150 ml of 0.002 M calcium chloride solution, 100 ml of 0.2 M sodium chloride solution and 50 ml of water. All the eluates were free of α-amylase. The enzyme was eluted with 400 ml of a 5% starch solution (starch, soluble according to Zulkowsky) in 0.02 M sodium glycerophosphate buffer of pH 6.9, with the addition of 0.002 M calcium chloride. The flow speed was 20 ml/hour. The eluate contained a total of 3,500 U of α-amylase, corresponding to 57% relative to the activity of the starting material.

What is claimed is:

1. A process for the separation of α-amylase from a liquid which contains α-amylase and foreign protein impurities which comprises adsorbing the α-amylase from the liquid onto an α-amylase inhibitor derived from wheat and bound to a carrier selected from the group consisting of a bead copolymer carrier of 70 mol % tetraethylene glycol dimethacrylate, 20 mol % methacrylic acid, and 10 mol % maleic acid anhydride, an agarose activated with cyanogen bromide, and a copolymer of 4.7% N,N'-methylene-bis-acrylamide, 71.5% acrylamide and 23.8% maleic acid in anhydride form to form an enzyme-inhibitor complex, and separating the complex from the liquid.

2. A process for the purification of α-amylase which comprises washing the complex of claim 1 and desorbing the α-amylase from the carrier-bound inhibitor to obtain α-amylase substantially free from foreign protein impurities.

3. The process of claim 1 wherein the liquid is a solution of extracts of animal organs.

4. The process according to claim 1 wherein the liquid is a pancreatic extract.

5. The process according to claim 4 wherein the pancreatic extract is a porcine pancreatic extract.

6. The process according to claim 1 wherein the liquid is a vegetable extract.

7. The process according to claim 1 wherein the inhibitor is derived from wheat bran.

8. A process for the removal of α-amylase as an impurity in an enzyme preparation which comprises adsorbing the α-amylase from the enzyme preparation onto a carrier-bound α-amylase inhibitor to form an enzyme inhibitor complex, separating the complex, washing the complex, and recovering the desired enzyme from the solution substantially free from α-amylase as an impurity, the inhibitor being derived from wheat and bound to a carrier selected from the group consisting of a bead copolymer carrier of 70 mol % of tetraethylene glycol dimethacrylate, 20 mol % methacrylic acid, and 10 mol % maleic acid anhydride, an agarose activated with cyanogen bromide, and a copolymer of 4.7% N,N'-methylene-bis-acrylamide, 71.5% acrylamide and 23.8% maleic acid in anhydride form or the inhibitor being derived from a microbe of the genus Actinomyces and being bound to amino groups of an insoluble polymeric carrier by reaction with reactive groups introduced into the inhibitor by reaction with cyanogen bromide.

9. A process for the separation of α-amylase from a liquid which contains α-amylase and foreign protein impurities which comprises adsorbing the α-amylase from the liquid onto a carrier-bound α-amylase inhibitor to form an enzyme-inhibitor complex, and separating the complex from the liquid, the inhibitor being derived from a microbe of the genus Actinomyces and being bound to amino groups of an insoluble polymeric carrier by reaction with reactive groups introduced into the inhibitor by reaction with cyanogen bromide.

10. The process according to claim 9 wherein the carrier is aminoethylcellulose.

11. The process according to claim 9 wherein the carrier is a polyacrylaminoethyl amide gel containing primary amino groups.

12. The process according to claim 2 wherein the complex is washed with aqueous sodium chloride solution.

13. The process according to claim 2 wherein the α-amylase is desorbed with starch solution.

14. The process according to claim 13 wherein the α-amylase is separated from the starch by adsorption onto an ion-exchange resin.

* * * * *